United States Patent [19]

Matsushita

[11] Patent Number: 4,730,580
[45] Date of Patent: Mar. 15, 1988

[54] INTERNAL COMBUSTION ENGINE PROVIDED WITH FUEL INJECTION DEVICE

[75] Inventor: Yukio Matsushita, Iwata, Japan

[73] Assignee: Sanshin Kogyo Kabushiki Kaisha, Hamamatus, Japan

[21] Appl. No.: 26,983

[22] Filed: Mar. 11, 1987

Related U.S. Application Data

[62] Division of Ser. No. 695,270, Jan. 28, 1985, Pat. No. 4,700,671.

[30] Foreign Application Priority Data

Jan. 26, 1984 [JP] Japan ................................ 59-11007
Jan. 26, 1984 [JP] Japan ................................ 59-11008

[51] Int. Cl.⁴ ............................................. F02B 33/04
[52] U.S. Cl. ........................... 123/73 AD; 123/196 R; 123/198 C
[58] Field of Search ........... 123/73 AD, 73 R, 196 R, 123/198 C

[56] References Cited

U.S. PATENT DOCUMENTS

| | | | |
|---|---|---|---|
| 3,707,955 | 1/1973 | Ulbing | 123/73 AD |
| 4,414,929 | 11/1983 | Sakurai | 123/73 AD |
| 4,471,727 | 9/1984 | Odashima | 123/73 AD |
| 4,480,602 | 11/1984 | Kobayashi et al. | 123/73 AD |

Primary Examiner—E. Rollins Cross
Attorney, Agent, or Firm—Ernest A. Beutler

[57] ABSTRACT

Several embodiments of fuel injection systems for internal combustion engines wherein certain components of the engine are lubricated directly by lubricant supplied by a lubricant pump and the lubricant pump also supplies lubricant to a fuel injection pump. In some embodiments, the fuel delivered to the injection pump is mixed with the fuel pumped by the injection pump for delivery to the engine through an injection nozzle.

9 Claims, 9 Drawing Figures

INTERNAL COMBUSTION ENGINE PROVIDED WITH FUEL INJECTION DEVICE

This is a division of application Ser. No. 695,270, filed Jan. 28, 1985, now U.S. Pat. No. 4,700,671.

BACKGROUND OF THE INVENTION

This invention relates to an internal combustion engine provided with a fuel injection device and more particularly to improvements in the lubrication of fuel injected internal combustion engines.

The advantages of fuel injection have resulted in a substantial increase in the number of fuel injected internal combustion engines. Many injection systems embody mechanically driven injection pumps that are employed for metering an exact amount of fuel during each injection cycle. Although such devices have considerable advantage due to their exactness, it is desirable to lubricate the mechanical components of the injection pump. Although devices have been proposed for delivering lubricant to the mechanical components of the fuel injection pump, the devices of the type heretofore proposed have used this same flow of lubricant for lubricating the other components of the engine. As a result, there is an uneven flow of lubricant due to the cylical action of the injection pump and it is necessary to circulate larger amounts of lubricant than may actually be required for the lubricating function.

It is, therefore, a principal object of this invention to provide an improved lubricating system for the injection pump of a fuel injected internal combustion engine.

It is a yet further object of this invention to provide a fuel injection pump lubricating system in which the amount of lubricant delivered to the various components of the engine may be accurately controlled and only the necessary amounts of lubricant supplied.

Because of the aforenoted advantages of fuel injection, its use has also become widely adapted with two-cycle in addition to four-cycle internal combustion engines. As is commonly known, many two-cycle internal combustion engines lubricate a number of their internal components through the mixing of lubricant with the fuel. With conventional types of engines, this has necessitated the operator's mixing lubricant with the fuel and this has a number of disadvantages, which are believed to be obvious.

It is, therefore, a further object of this invention to provide a lubricating system for a two-cycle, fuel injected internal combustion engine wherein it is unnecessary to mix lubricant with the fuel by the operator.

It is a further object of this invention to provide an improved lubricating system for a two-cycle, fuel injection internal combustion engine wherein lubricant is automatically mixed with the fuel injected by the fuel injection pump.

In addition to providing a lubricating function for the engine, it has been found that the amount of fuel injected by an injection pump can vary significantly with the viscosity of the fuel. If only fuel is being injected, it may be difficult to provide adequate control for the amount of fuel injected, due to these viscosity changes, under all running and atmospheric conditions. It has been found, however, that these variations can be significantly reduced if an amount of lubricant is mixed with the fuel that is pumped by the injection pump.

It is, therefore, a further object of this invention to provide an improved and more accurate fuel injection system for an internal combustion engine.

SUMMARY OF THE INVENTION

A first feature of this invention is adapted to be embodied in an internal combustion engine having a lubricant pump for delivering lubricant from a lubricant source and a fuel injection pump for delivering fuel from a fuel source to the engine for combustion. In accordance with this feature of the invention, means are provided for delivering a first portion of the lubricant delivered by the lubricant pump directly to the engine for lubricating the engine and a second portion of the lubricant delivered by the lubricant pump to the fuel injection pump.

Another feature of the invention is adapted to be embodied in an internal combustion engine comprising a fuel injection pump having an injection member movable through a stroke for pumping a predetermined amount of fuel for delivery to the engine for combustion and mechanical driving means for driving said injection member through its stroke. Lubricant pump means are further incorporated for delivering lubricant from a source. In accordance with this feature of the invention, means are provided for delivering lubricant from the lubricant pump means first to the mechanical drive means for lubricating the mechanical drive means and for mixing the lubricant with the fuel delivered to the engine by the injection member of the fuel injection pump.

Yet a further feature of the invention is adapted to be embodied in an internal combustion engine having a lubricant pump for delivering lubricant from a lubricant source and a fuel injection pump having an inlet and an outlet for delivering fuel from a fuel source to the engine for combustion. In accordance with this feature of the invention, means deliver lubricant from the lubricant pump to the fuel injection pump inlet for mixing with the fuel pump by the fuel injection pump.

DETAILED DESCRIPTION OF THE PREFERRED EMBODIMENTS

Figure 1:
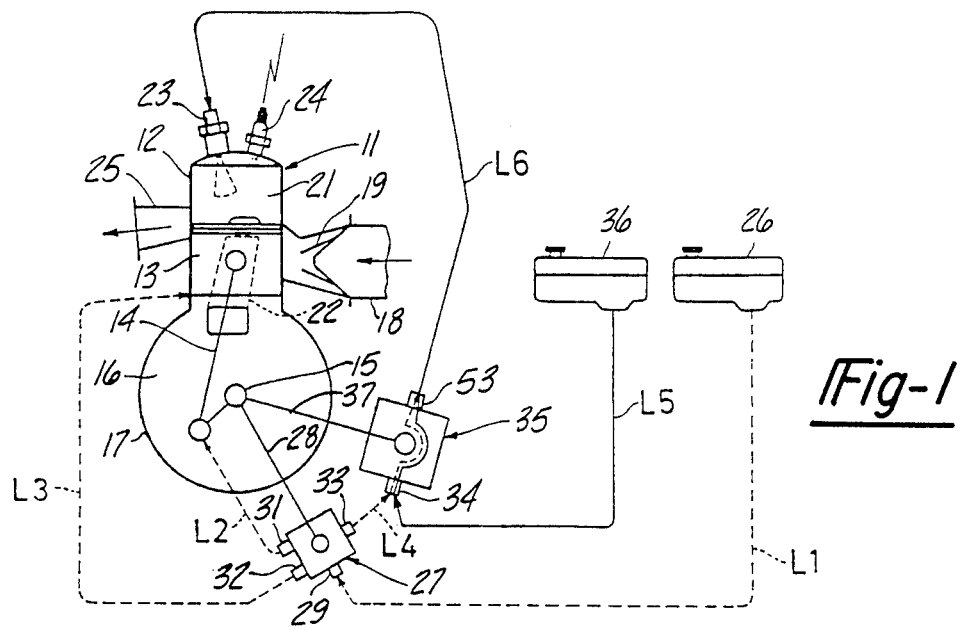
FIG. 1 is a partially schematic view of a two-cycle internal combustion engine having a fuel injection and lubricating system constructed in accordance with a first embodiment of the invention.
Figure 2:
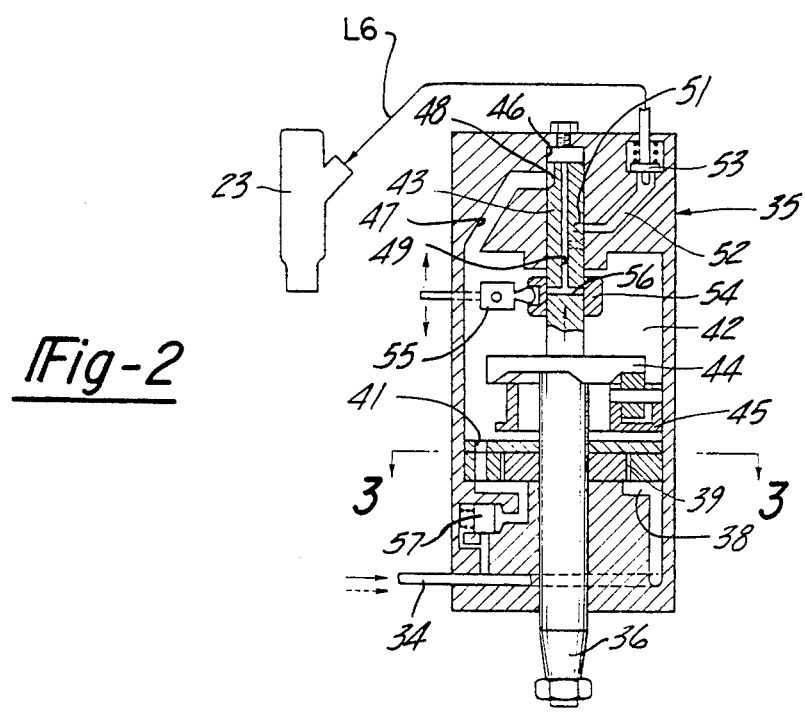
FIG. 2 is an enlarged cross-sectional view showing the fuel injection pump of this embodiment and its association with the fuel injection nozzle.
Figure 3:
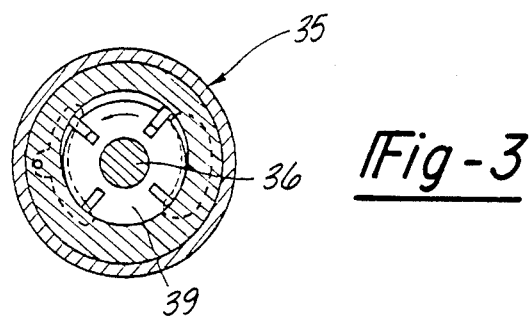
FIG. 3 is a cross-sectional view taken along the line 3—3 of FIG. 1.

Embodiment of FIGS. 1 Through 3

Referring first to the embodiment of FIGS. 1 through 3 and initially to FIG. 1, a two-cycle internal combustion engine having a fuel injection and lubricating system constructed in accordance with a first embodiment of the invention is identified generally by the reference numeral 11. As illustrated, the engine 11 is of the single cylinder type but it is to be understood that this is for illustrative purposes only and that the invention may be capable of use with engines having any number of cylinders, cylinder orientation or, for that matter, other than reciprocating type engines.

The engine 11 includes a cylinder block 12 having a cylinder bore in which a piston 13 is supported for reciprocation. The piston 13 is drivingly connected to a connecting rod 14 which, in turn, drives a crankshaft 15 in a known manner. The crankshaft 15 is rotatably journaled within a crankcase chamber 16 of a crankcase assembly 17.

An air charge is drawn into the crankcase 17 during reciprocation of the piston 13 through an induction manifold 18 and reed type check valve 19. The check valve 19 insures against backflow of air from the crankcase chamber 17 during downward movement of the piston 13 during which time the charge in the crankcase chamber 16 is compressed.

The compressed charge is transferred from the crankcase chamber 16 to a combustion chamber 21 formed above the head of the piston 13 through one or more transfer passages 22.

A fuel lubricant mixture is injected into the combustion chamber 21 at an appropriate time by means that include a fuel injection nozzle 23 that is supported in the cylinder head of the engine 11. The fuel/lubricant mixture is delivered to the injection nozzle 23 in a manner to be described. The fuel/air charge thus formed in the combustion chamber 21 is ignited by means of a spark plug 24 that is fired in a suitable manner. The burnt fuel/air charge is discharged from the combustion chamber 21 through an exhaust port 25.

The engine 11 as thus far described may be considered to be convention in construction and for that reason those conventional componets have not been illustrated in any great detail. It is believed that those skilled in the art will readily realize how the invention can be applied to any of the known types of engines.

Still referring to FIG. 1, the engine 11 is provided with a separate lubricating system so that it will not be necessary for an operator to mix lubricant with the fuel. This separate lubricating system includes a lubricant tank 26 that may be positioned remotely from the engine and which delivers lubricant to an engine driven lubricant pump 27, which may be of any known type, through a line L1. The lubricant lines have been illustrated in the drawings by broken lines so as to assist in understanding the invention. The lubricant pump 27, as has been previously noted, is driven from the engine and the schematic line 28 indicates the driving relationship between the crankcase 15 and the pumping element (not shown) of the lubricant pump 27. The line L1 delivers the lubricant to an inlet fitting 29 of the lubricant pump 27. The lubricant pump 27 has a plurality of discharge fittings 31, 32, and 33 that supply lubricant to various locations, as will become apparent.

The outlet fittings 31 and 32 may be employed to deliver lubricant to certain components of the engine as may be required. For example, the fitting 31 may communicate with line L2 that delivers lubricant directly to the journals of the crankshaft 15. In a like manner, the fitting 32 may be connected by means of a line L3 to an outlet in the wall of the cylinder adjacent the bottom dead center position of the piston 13 for directly lubricating the piston skirt. It is to be understood that these lubricant delivery points are purely exemplary and that lubricant may be delivered, in accordance with the invention, to any desired components of the engine which require lubricant.

The fitting 33, on the other hand, delivers lubricant through a line L4 to an inlet fitting 34 of a fuel injection pump, indicated generally by the reference numeral 35 and shown in most detail in FIGS. 2 and 3 to which reference may now be had.

The fuel injection pump 35 has its inlet fitting 34 in communication with a remotely positioned fuel tank 36 via a fuel delivery line L5. The fuel delivery line L5 and other lines that deliver predominantly fuel are illustrated in the drawings by solid lines so as to facilitate understanding. The lines L5 and L4 are merged at the fitting 34 through any suitable device so that both fuel from the source 34 and lubricant from the lubricant pump 33 will both be delivered to the inlet 34.

The fuel injection pump 35 includes a driving member 36 in the form of a shaft which is journaled in the housing of the fuel injection pump 35 and which is driven directly by the engine, as by means of a line, indicated schematically at 37, that connects the pump driving member 36 with the crankshaft 15 so that these two elements will be driven in unison.

A lower portion of the fuel injection pump 35 forms a high pressure pumping chamber 38 in which a rotor 39 is carried, which rotor 39 is affixed in a suitable manner, as by means of a splined or key connection, to the driving shaft 36. A plurality of vanes are carried by the rotor 39 and cooperate with suitable openings so as to pressurize the fuel/lubricant mixture delivered from the inlet 35 and to deliver it through an outlet opening 41 into a main chamber 42 of the fuel injection pump 35.

Supported within this chamber 42 is an injection pumping member 43 that is carried by a cam plate 44 and which is rotatably coupled with the driving shaft 36 but axially movable relative to it. The cam member 44 cooperates with a fixed cam ring 45 carried within the chamber 42 so that rotation of the driving shaft 36 will effect both rotation of the pumping member 43 and its reciprocation due to the cooperation of the cam member 44 with the cam ring 45.

The upper end of the injection pumping member 43 is received within a bore 46 formed in the fuel injection pump housing. A passage 47 can communicate this bore 46 with the pressure chamber 42 through a relief 48 formed in the upper end of the pumping member 43 at a fixed circumferential location. The rotation of the pumping member 43 caused by the rotation of the driving shaft 36 will cause the relief 48 to permit communication between the passageway 47 and counterbore 46 when the pumping member 43 is at the lower portion of its stroke. As the pumping member 43 moves upwardly, this communication will be cut off by both rotation of the member 43 and by its axial movement.

The upward movement of the pumping member 43 will cause the fluid in the bore 46 to be pressurized and to be delivered through a delivery passage 49 extending axially through the pumping member 43. This fuel can then be discharged through a radially extending passageway 51 formed in the pumping member 43 at a fixed radical position to a discharge passage 52 formed in the fuel injection pump housing. Like the relief 48, the passageway 51 is radially positioned so that it will be aligned with the delivery passage 52 at the appropriate position of the stroke of the pumping member so as to effect pump discharge through the passage 52 past a delivery check valve 53 through a conduit L6 to the fuel injection nozzle 23 for discharge into the combustion chamber 21 as aforedescribed.

A spill ring 54 is journaled around the pumping member 43 and is controlled by means of a lever 55 so as to selectively control the discharge of fuel from a cross drilled passageway 56 back into the chamber 42 so as to control the amount of fuel delivered by the pumping member 43 through the discharge line L6.

A pressure relief valve 57 is provided in communication with the vane pumping rotor 39 so as to discharge fuel back into the inlet line and limit the maximum pressure generated in the pumping chamber 42.

It should be readily apparent that the described embodiment is effective so as to provide direct lubricant flow to certain highly stressed components of the engine and to further mix lubricant with fuel that is delivered to the fuel injection pump 35. This lubricant which is added to the fuel can be utilized to lubricate the internal components of the fuel injection pump 35, other components of the engine 11 and, furthermore, so as to control the viscosity of the mixture pumped by the fuel injection pump 35 to afford more accurate control.

Figure 4:
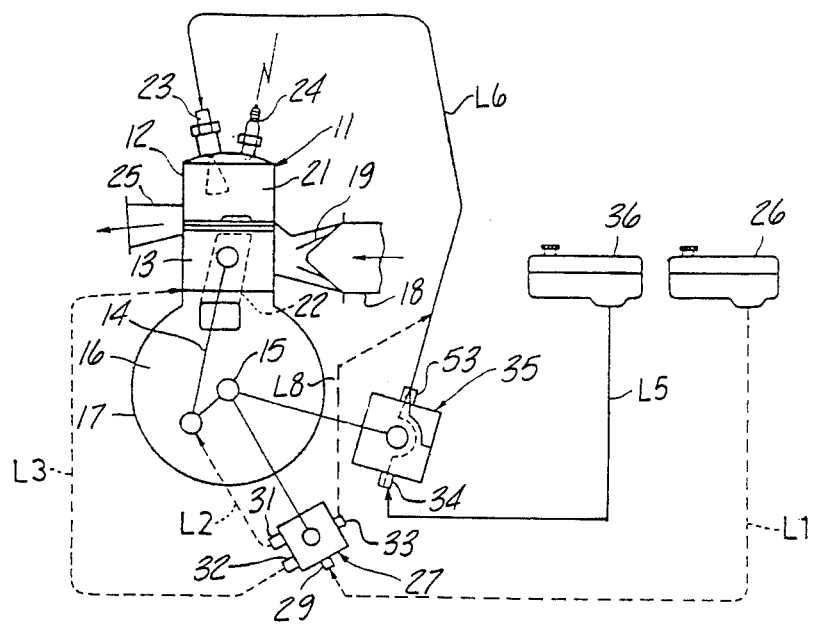
FIG. 4 is a schematic view, in part similar to FIG. 1, showing a further embodiment of the invention.

Embodiment of FIG. 4

FIG. 4 shows an embodiment of the invention which is substantially similar to the embodiment of FIGS. 1 through 3 and, for that reason, components which are the same as those components of that earlier embodiment have been identified by the same reference numeral and the description of the construction and operation of these components will not be repeated. In this embodiment, the lubricant pump outlet 33 communicates with the discharge side of the fuel injection pump 35 rather than with its inlet. Therefore, a line L8 extends from the lubricant pump discharge port 33 directly to the line L6 downstream of the fuel injection pump discharge valve 53. Thus, this embodiment does not have certain of the advantages of the embodiment of FIGS. 1 through 3 in that the components of the fuel injection pump 35 will not be lubricated by the lubricant delivered from the line L8. However, lubricant will be mixed with the fuel for delivery to the injection nozzle 23 and thus can be utilized to lubricate components of the engine which are directly lubricated and to supplement the lubrication of those directly lubricated components. In other regards, this embodiment is the same as the previously described embodiment.

Figure 5:
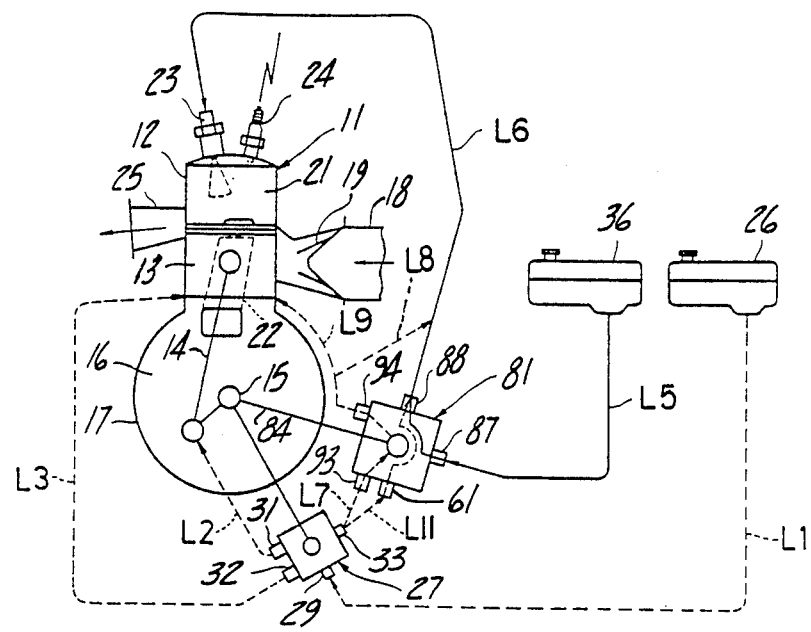
FIG. 5 is a schematic view, in part similar to FIGS. 1 and 4, showing a still further embodiment of the invention.
Figure 6:
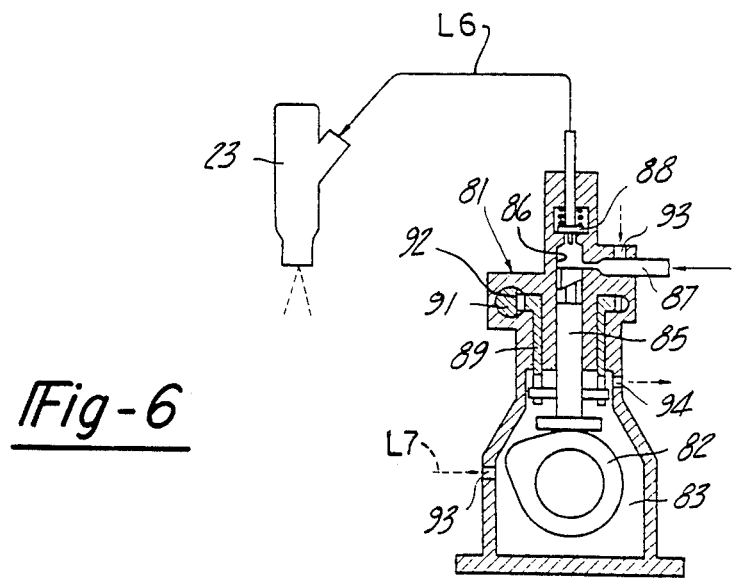
FIG. 6 is an enlarged cross-sectional view through the fuel injection pump of the embodiment of FIG. 5 and shows its association with the fuel injection nozzle.

Embodiment of FIGS. 5 and 6

A further embodiment of the invention is illustrated in FIGS. 5 and 6 and is adapted to be employed in an engine of the general type as disclosed in the previous embodiments. As with those embodiments, however, the principle of the invention may be employed in connection with engines of other types than those illustrated. The embodiment of these figures differs from the previously described embodiments in connection with the type of fuel injection pump employed. In addition, the manner of delivering lubricant to lubricate the fuel injection pump and to introduce it into the fuel system differs from the previous embodiments.

In this embodiment, like the others, the lubricant pump 27 has a number of outlets that supply lubricant directly to components of the engine to be lubricated such as the outlets 31 and 32 and the lines L2 and L3. In this embodiment, the fuel injection pump is indicated generally by the reference numeral 81 and includes a housing in which a cam 82 is contained within a chamber 83 and is driven by the engine crankshaft 15 as indicated by the schematic line 84. A plunger 85 is engaged with the cam 82 and is supported within a bore 86 of the housing. A fuel inlet 87 communicates with the bore 86 and is adapted to receive fuel from the fuel source 36 through the line L5. A pressure pump (not shown) may be provided to pressurize the fuel delivered to the injection pump 81. Reciprocation of the plunger 85 causes the fuel to be compressed and delivered past a delivery valve 88 to the line L6 for delivery to the injection nozzle 23.

The amount of fuel injected for each reciprocation of the plunger 85 is controlled by a shutoff cam surface formed at the upper end of the plunger 85. The control is achieved by rotating the plunger via a sleeve 89 that is contained within the fuel pump housing and which is connected for rotation with the plunger 85 while permitting its reciprocation in any suitable manner, as by means of a spline or key connection. The sleeve 89 is rotated by means of a rack 91 that is engaged with a gear 92 formed at the upper end of the sleeve 89.

A lubricant inlet 93 is formed in the chamber 83 and a lubricant outlet line 94 extends from the upper end of this chamber. Lubricant is delivered to the chamber 83 from the oil pump outlet fitting 33 through a line L7. The lubricant in the chamber 83 lubricates the moving parts of the lubricant pump and specifically the engagement between the cam 82 and the lower end of the plunger 85. The lubricant discharged from the outlet 94 may either be returned to the fuel line L6 through a line L8 or to a portion of the engine to be lubricated, as indicated by the line L9, or both.

Lubricant may also be mixed with fuel through a line L11 that extends from the lubricant pump outlet 33 to a T-line 93 that is formed in the pump housing and which intersects the fuel inlet line 87.

It should be readily apparent that this embodiment, like the previous embodiments, embodies an arrangement for supplying the fuel injection pump with lubricant from a separate source while at the same time positively lubricating certain desired components of the engine. In addition, lubricant is mixed with the fuel so as to provide a further lubricating function for the engine and so as to improve and stabilize the viscosity of the fuel being pumped by the fuel injection pump 81.

Figure 7:
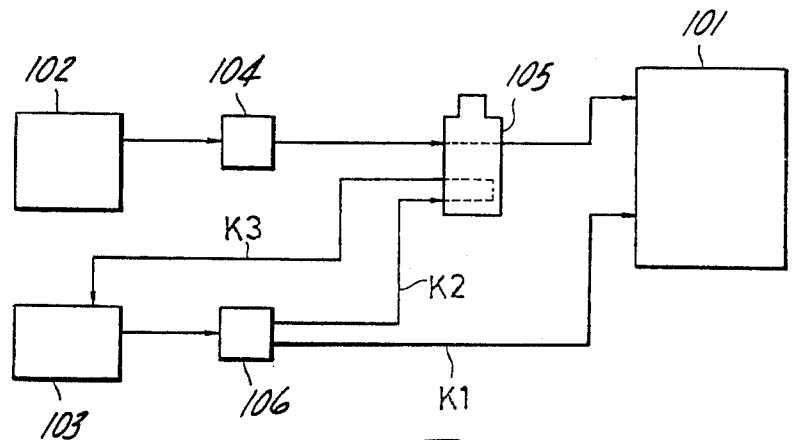
FIG. 7 is a schematic view illustrating a still further embodiment of the invention.

Embodiment of FIG. 7

FIG. 7 illustrates a still further embodiment of the invention. In this embodiment, the engine is identified generally by the block 101, the fuel supply by the block 102 and the lubricant supply by the block 103. A fuel supply pump 104 delivers fuel from the tank 102 to a fuel injection pump 105, which may be of the type shown in FIGS. 5 and 6, for delivery to the fuel injector of the engine.

A lubricant pump 106 is driven by the engine 101 and has one or more outlets that supply portions of the engine 101 with direct lubricant as through the line K1.

In addition, a separate outlet of the lubricant pump 106 delivers lubricant to the chamber of the fuel injection pump 105 where the cam and plunger are engaged through a line K2. This lubricant is delivered from the outlet of the chamber back to the lubricant source 103 through a line K3. Thus, like the previously described embodiments, this arrangement provides a separate source of lubricant for the fuel injection pump and to certain components of the engine to be lubricated.

Figure 8:
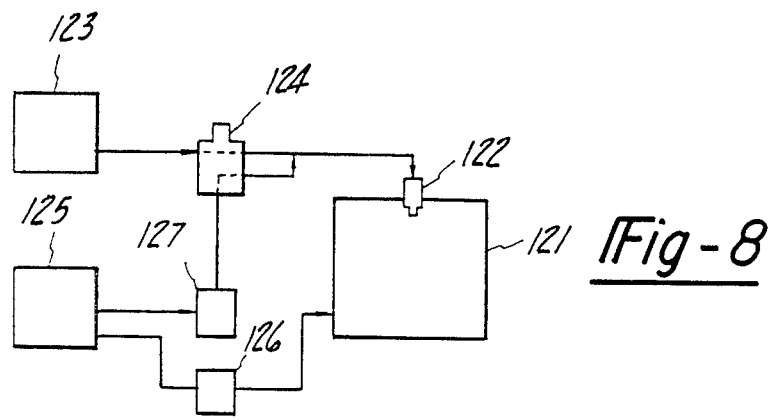
FIG. 8 is a schematic view, in part similar to FIG. 7, showing another embodiment of the invention.

Embodiment of FIG. 8

A still further embodiment of the invention is shown schematically in FIG. 8 wherein an engine is represented by the block 121. The engine 121 has a fuel injection nozzle 122 that is supplied with fuel from a source 123 by means of a fuel injection pump 124 which may be of the type shown in FIGS. 1 through 3 or of the type shown in FIGS. 5 and 6.

A lubricant source 125 supplies a first lubricant pump 126 that delivers lubricant through one or more lines to the components of the engine 121 to be directly lubricated. A separate lubricant pump 127, which may be formed in the same housing as the pump 126 and driven simultaneously with it, delivers lubricant to the fuel injection pump 124. This lubricant may be then mixed with the fuel delivered by the fuel injection pump 124 either in the manner shown in FIGS. 1 through 3 or in one of the manners shown in FIGS. 5 and 6.

Figure 9:
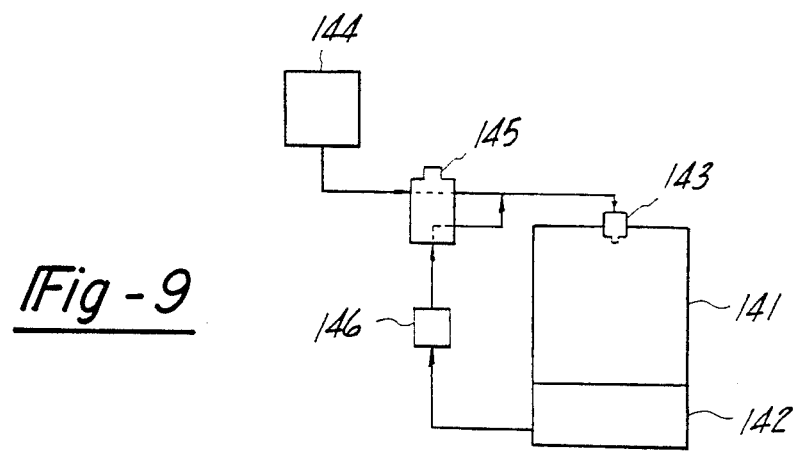
FIG. 9 is a schematic view, in part similar to FIGS. 7 and 8, showing yet another embodiment of the invention.

Embodiment of FIG. 9

FIG. 9 shows how the invention may be employed in conjunction with a four-cycle engine which is designated by the reference 141 and which has an integral crankcase or oil sump 142. A fuel injection nozzle 143 supplies fuel to the engine 141 from a fuel source 144. A fuel injection pump 145 delivers fuel from the source 144 to the injection nozzle 143. The pump 145 may be of any of the types herein disclosed or may be of any other known type.

The engine 141 is provided with an internal oil pump that circulates lubricant from the crankcase 142 to the portions of the engine to be lubricated in a known manner. Either this or a separate engine driven oil pump 146 is provided for delivering lubricant from the crankcase 142 to the fuel injection pump 145 in the manner of any of the previously described embodiments. The lubricant may then be mixed with the fuel pumped by the fuel injection pump 145 and delivered to the fuel injection nozzle 143.

It should be readily apparent from the foregoing description that several embodiments have been illustrated and described, each of which provides lubrication for the fuel injection pump. In some of the embodiments, this lubricant is also mixed with the fuel either before introduction to the fuel injection pump or after so as to improve the viscosity stabilization of the fuel.

Although a number of embodiments have been illustrated and described, it is to be understood that various changes and modifications may be made without departing from the spirit and scope of the invention as defined by the appended claims.

What is claimed is:

1. In a two-cycle internal combustion engine having a crankcase, a combustion chamber, a lubricant pump for delivering lubricant from a lubricant source and a fuel injection pump having an inlet and an outlet for delivering fuel from a fuel source to said combustion chamber independently of said crankcase for combustion, the improvement comprising means for delivering lubricant from said lubricant pump to said crankcase for lubricating the components therein.

2. In a two-cycle internal combustion engine as set forth in claim 1 wherein the lubricant pump has a discharge for delivering lubricant to the inlet of said fuel injection pump for mixing with the fuel delivered thereby.

3. In a two-cycle internal combustion engine as set forth in claim 2 wherein the fuel injection pump comprises a vane type pressure pump and a plunger type delivery pump, the lubricant being delivered to the inlet to the vane type pressure pump.

4. In an internal combustion engine comprising a fuel injection pump having an injection member movable through a stroke for pumping a predetermined amount of fuel for delivery to the engine for combustion, mechanical drive means for driving said injection member through its stroke, and lubricant pump means for delivering lubricant from a source, the improvements comprising means for delivering lubricant from said lubricant pump means to said mechanical drive means for lubricating said mechanical drive means and for mixing lubricant with the fuel delivered to the engine by said injection member of said fuel injection pump.

5. In an internal combustion engine as set forth in claim 4 wherein the lubricant is mixed with the fuel prior to delivery to the fuel injection pump.

6. In an internal combustion engine as set forth in claim 5 further including means for delivering lubricant from the lubricant pump directly to other components of the engine to be lubricated.

7. In an internal combustion engine as set forth in claim 4 wherein the lubricant is mixed with the fuel after the fuel has been pump by the injection member.

8. In an internal combustion engine as set forth in claim 7 further including means for delivering lubricant from the lubricant pump directly to other components of the engine to be lubricated.

9. In an internal combustion engine as set forth in claim 4 wherein the lubricant delivered to the mechanical drive means is returned to the lubricant source.

* * * * *